Oct. 5, 1965 R. A. WARD 3,210,599

TWO-SPEED DEFLECTION SYSTEMS FOR DATA DISPLAYING CATHODE RAY TUBES

Filed Jan. 4, 1962

INVENTOR

Ronald Arthur Ward

BY

Baldwin & Wight

ATTORNEYS

United States Patent Office 3,210,599
Patented Oct. 5, 1965

3,210,599

TWO-SPEED DEFLECTION SYSTEMS FOR DATA DISPLAYING CATHODE RAY TUBES

Ronald Arthur Ward, Maldon, Essex, England, assignor to The Marconi Company Limited, a British company Filed Jan. 4, 1962, Ser. No. 164,261
Claims priority, application Great Britain, Mar. 3, 1961, 7,818/61
3 Claims. (Cl. 315—27)

Figure 2:
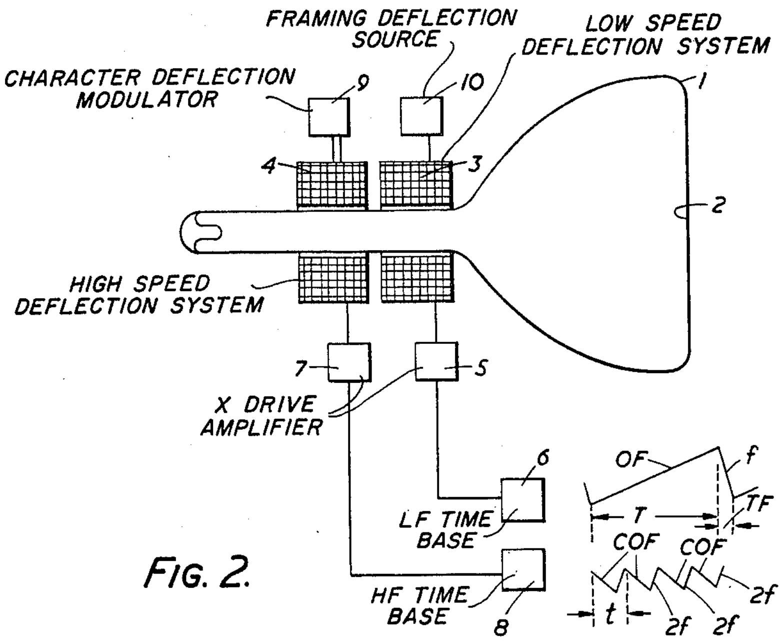

This invention relates to data displaying cathode ray tube arrangements and more specifically to such arrangements of the kind in which a cathode ray tube is provided with two deflecting systems, usually called respectively the main deflecting system and the auxiliary deflecting system, the auxiliary system being a relatively high speed, small deflection amplitude system which is fed with deflecting signals to cause the cathode ray to trace over a small area such as a letter or other indicating character determined by said signals and the main deflecting system being a relatively low speed, large deflection amplitude system, the purpose of which is to determine the position of the small area where any individual character is to be traced and which is subjected to suitable deflecting components for that purpose. The main and auxiliary deflecting systems are usually (though not necessarily) of the electro-magnetic deflection type. Data displaying arrangements of the kind referred to can be employed to produce tabular displays by using the main deflecting system to cause the cathode ray to occupy successive mean positions lying in rows or columns and using the auxiliary deflecting system to cause the ray to trace a desired character about each successive mean position. In most cases the cathode ray tube is an ordinary display tube having a fluorescent screen on which the characters are traced, but it may be a tube of the storage type with a storage electrode which is scanned by the cathode ray to store signals corresponding to the characters. Where a storage tube of the direct viewing type is employed, characters "stored" on the storage electrode thereof may be visibly displayed, when desired, on the viewing screen of the tube in accordance with well known practice with such direct viewing storage tubes. The storage tube may, however, be of the type comprising means for scanning the storage electrode to produce output signals corresponding to signals stored on its storage electrode, in which case characters "stored" on the storage electrode may be displayed when required by feeding them to an ordinary display tube operated after the manner of a television reproducer tube or by feeding them to operate a photographic recording system or by utilising them in any other convenient manner known per se to produce, directly or indirectly, a visible display. The present invention is applicable to all data displaying cathode ray tube arrangments of the kind referred to, whether the tube employed is an ordinary director displaying cathode ray tube with a fluorescent screen or a storage tube of the direct viewing type or a storage tube adapted to provide output signals corresponding to signals stored therein.

For the sake of brevity, data displaying cathode ray tube arrangements of the kind referred to will be hereinafter designated two-speed deflection data displaying cathode ray tube arrangements; the deflecting system adapted to be fed with character forming signals will be hereinafter designated the high-speed deflecting system; and the other deflecting system will be hereinafter designated the low-speed deflecting system.

Figures 1, 3:
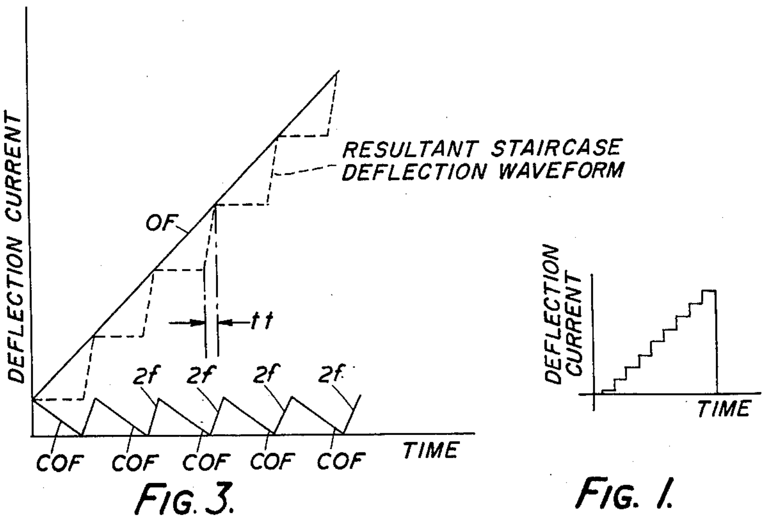

The invention is illustrated in and explained in connection with the accompanying drawings, in which FIGURES 1 and 3 are explanatory graphical figures and FIGURE 2 is a highly simplified block diagram of an embodiment of the invention using an ordinary (i.e. non-storage) display tube.

When a display of a tabulated nature is required to be produced with the aid of a two-speed deflection data displaying cathode ray tube arrangement, it is usual practice to feed the character forming signals to the high speed deflecting system and to feed to the low speed deflecting system a "staircase" waveform to produce deflection in one direction, e.g. the X direction. (In most cases, of course, the low speed deflecting system is also subjected to suitable deflection in the framing or Y direction, but the invention is not concerned with this.) FIGURE 1 shows such a staircase waveform as it should be ideally. If the low speed deflecting system is of the electro-magnetic type the waveform of FIGURE 1 connects current (ordinates) with time (abscissae). If a waveform as shown in FIGURE 1 is obtained the cathode ray will move in the X direction in a series of steps, occupying each of its successive mean positions for an equal time (during which the high speed deflecting system causes a character to be traced) and moving instantaneously (theoretically) from each mean position to the next. In practice, however, owing to the electrical equivalents of inertia in the low speed deflecting system and/or in the driving amplifying means therefor, this ideal result is not obtained. It takes time for the deflecting force to change from the required value at one "step" of the staircase to the required value at the next and, since the low speed deflecting system must be designed to handle large amplitude deflections, the aforesaid electrical equivalent of inertia is necessarily rather high and the time needed is often excessive, severely limiting the speed at which the arrangement will work satisfactorily. Also it is exceedingly difficult to satisfy the practical operating requirement that the time taken for the ray to move from one mean position to the next shall be constant. To consider the customary case of a low speed deflecting system of the electro-magnetic type, the time taken for the deflecting current to change from one step value to the next is determined mainly by the inductance of the coil through which the current is caused to flow and, in ordinary practice, this inductance is large enough to cause the said time to be undesirably large. In addition it is difficult to make the said time the same for all transitions from step to step because of the effect of different values of output impedance presented by the driving amplifier at different parts of the staircase.

The present invention seeks to avoid these defects. The invention takes advantage of the fact that because the high speed deflecting system and its driving amplifier are designed to handle high speed and small amplitude deflections, the high speed deflecting system and driving amplifier will present much smaller "inertia" effects than the low speed deflecting system and its driving amplifier.

According to this invention a two-speed deflection data displaying cathode ray tube arrangement comprising a cathode ray tube and high and low speed deflecting systems therefor includes means for supplying to the low speed deflecting system a relatively low frequency deflecting waveform adapted to produce substantially full deflection of the cathode ray in a predetermined direction and means for supplying to the high speed deflecting system a relatively high frequency deflecting waveform having two portions, one of which opposes and substantially counterbalances, and the other of which supplements, the ray deflection in said direction produced by the said relatively low frequency waveform, the whole arrangement being such that the combined effect of the two waveforms is to cause said ray to move in said predetermined direction in a series of short movements occurring at substantially the same speed and at substantially the same time intervals.

Preferably the two waveforms are substantially linear saw-tooth waveforms, the relatively low frequency waveform applied to the low frequency deflecting system having a substantially linear flank of length such as to produce substantially full deflection and the relatively high frequency waveform applied to the high frequency deflecting system being of a time period which is substantially an integral fraction of the time length of the flank of said relatively low frequency waveform and having a substantially linear flank whose slope is substantially equal to and opposite to that of the flank of said relatively low frequency waveform.

Preferably the two deflecting systems are electromagnetic and the aforesaid waveforms are current waveforms.

It is to be understood, of course, that the deflecting waveforms above mentioned are additional to any deflecting waveforms which may be applied for other purposes. Thus the waveform above described as applied to the high speed deflecting system is additional to the deflecting signals applied thereto for character tracing and the low frequency waveform above described as applied to the low speed deflecting system is additional to any which may be applied to produce deflection in the framing direction, i.e. in a direction perpendicular to that produced by said low frequency waveform.

Referring now to FIGURE 2, 1 is a display cathode ray tube which is only diagrammatically represented and which has the customary fluorescent screen on the inner face of its end wall 2. 3 and 4 are electro-magnetic deflecting coil systems arranged round the neck of the tube and constituting respectively the low speed deflecting system and the high speed deflecting system. The part of the coil system 3 adapted to produce deflection in the X direction is energised via a drive amplifier 5 from a saw-tooth current wave source 6 adapted to produce a deflecting saw-tooth wave current as represented in the drawing to the right of the block 6. This saw-tooth wave has a linear operating flank OF of time length T and a fly-back portion $f$ of time length $T_F$.

The X direction deflecting portion of the coil system 4 is fed through a drive amplifier 7 from a second saw-tooth current wave source 8 of higher frequency than the source 6 and adapted to produce a deflecting current waveform as represented in the drawing to the right of block 8. This waveform is of periodicity $t$ and comprises operating flank portions COF and flyback portions 2$f$, $t$ being chosen to be an integral fraction of T, i.e. $nt=T$ where $n$ is a whole number. The slope of the flanks COF is equal and opposite to that of the flank OF.

The relation between the two waveforms is better shown in FIGURE 3 where the straight line OF is the flank of a saw-tooth deflecting current wave obtained from the source 6. Below the line OF is represented (in full lines) a saw-tooth deflecting current wave obtained from the source 8. The combined ray deflection effect in the X direction of the two waveforms is represented by the broken line staircase waveform in FIGURE 3. In this figure the transition time from one step to the next indicated by the dimension $tt$.

It will be appreciated that since with an arrangement in accordance with this invention the low speed deflecting system does not have to handle high speed deflecting components the defects of the known arrangements hereinbefore described are avoided.

It will be understood that the high speed deflecting system is also energised by deflecting signals for causing character tracing in the usual way. A course of such character forming signals is represented by the block 9. Similarly if, as will usually be the case, framing deflection is also required in the Y direction a source of suitable Y direction deflecting current waveform is provided. Such a source is represented by the block 10. No description is herein given of the equipment in the blocks 9 and 10 since these form per se no part of this invention and may be in accordance with known practice.

I claim:

1. A two-speed deflection data displaying cathode ray tube arrangement comprising: a cathode ray tube; a high speed deflecting system for said tube including a high frequency electromagnetic deflecting coil; a low speed deflecting system for said tube including a low frequency electromagnetic deflecting coil separate from said high frequency deflecting coil; means for supplying to said high speed deflecting system deflection signals corresponding to data to be displayed; means for supplying to the low speed deflecting system a relatively low frequency deflecting waveform to produce substantially full deflection of the cathode ray in a predetermined direction; and means for supplying to the high speed deflecting system, in addition to said deflection signals corresponding to data to be displayed, a relatively high frequency deflecting waveform having two portions, one of which opposes and substantially counterbalances, and the other of which supplements, the ray deflection in said direction produced by the said relatively low frequency waveform, the whole arrangement being such that the combined effect of the two waveforms is to cause said ray to move in said predetermined direction in a series of short movements occurring at substantially the same speed and at substantially the same time intervals.

2. An arrangement as claimed in claim 1 wherein both said relatively low frequency deflecting waveform and said relatively high frequency deflecting waveform are current waveforms.

3. An arrangement as claimed in claim 1 wherein said cathode ray tube is an ordinary director displaying cathode ray tube with a fluorescent screen.

References Cited by the Examiner

UNITED STATES PATENTS

| | | | |
|---|---|---|---|
| 2,465,355 | 3/49 | Cook | 340—324.1 |
| 2,623,196 | 12/52 | Toulon | 315—26 |

OTHER REFERENCES

Fink: Television Engineering, McGraw-Hill, New York, 1952, 2nd edition, pages 170–173 and 186–192.

DAVID G. REDINBAUGH, *Primary Examiner.*

RALPH G. NILSON, *Examiner.*